US010301437B2

(12) United States Patent
Pietarinen et al.

(10) Patent No.: US 10,301,437 B2
(45) Date of Patent: *May 28, 2019

(54) METHOD FOR TREATING LIGNIN AND FOR PRODUCING A BINDER COMPOSITION (71) Applicant: UPM-KYMMENE CORPORATION, Helsinki (FI)

(72) Inventors: Suvi Pietarinen, Lappeenranta (FI); Sanna Valkonen, Lappeenranta (FI); Okko Ringena, Neusäss (DE)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/033,732

(22) PCT Filed: Nov. 25, 2014

(86) PCT No.: PCT/FI2014/050902
§ 371 (c)(1),
(2) Date: May 2, 2016

(87) PCT Pub. No.: WO2015/079107
PCT Pub. Date: Jun. 4, 2015

(65) Prior Publication Data
US 2016/0257791 A1 Sep. 8, 2016

(30) Foreign Application Priority Data
Nov. 26, 2013 (FI) ...................................... 20136178

(51) Int. Cl.
*C08H 7/00* (2011.01)
*B27N 3/00* (2006.01)
*C09J 197/00* (2006.01)
*C08K 5/00* (2006.01)
*C08K 5/07* (2006.01)
*C07G 1/00* (2011.01)

(52) U.S. Cl.
CPC ............... *C08H 6/00* (2013.01); *B27N 3/002* (2013.01); *C07G 1/00* (2013.01); *C08K 5/0025* (2013.01); *C08K 5/07* (2013.01); *C09J 197/005* (2013.01); *B27N 3/00* (2013.01)

(58) Field of Classification Search
CPC ........................................................ C08H 6/00
See application file for complete search history.

(56) References Cited

U.S. PATENT DOCUMENTS

| | | | | |
|---|---|---|---|---|
| 4,017,430 A * | 4/1977 | Briggs | ..................... | C08H 6/00 530/500 |
| 4,476,193 A | 10/1984 | Seidel et al. | | |
| 5,010,156 A * | 4/1991 | Cook | ..................... | C08G 14/14 527/403 |
| 5,866,642 A * | 2/1999 | McVay | ..................... | C08H 6/00 524/13 |
| 6,632,912 B2 | 10/2003 | Sudan | | |
| 2009/0209739 A1 * | 8/2009 | Funaoka | .............. | B01J 20/0211 530/502 |

FOREIGN PATENT DOCUMENTS

| | | |
|---|---|---|
| CA | 1185238 A | 4/1985 |
| CA | 1229334 A | 11/1987 |
| CA | 1284637 C | 6/1991 |
| CA | 2043399 A1 | 11/1991 |
| CA | 2043313 A1 | 11/1992 |
| CA | 2551418 A1 | 3/1999 |
| CA | 2471591 A1 | 7/2003 |
| CA | 2544323 A1 | 5/2005 |
| CA | 2611437 A1 | 12/2006 |
| CA | 2798196 A1 | 12/2010 |
| CA | 2780466 A1 | 5/2011 |
| CA | 2781093 A1 | 6/2011 |
| CA | 2798268 A1 | 8/2011 |
| CA | 2812685 A1 | 3/2012 |
| CA | 2813798 A1 | 5/2012 |
| CA | 2821520 A1 | 6/2012 |
| CA | 2822087 A1 | 6/2012 |
| CA | 2822105 A1 | 6/2012 |
| CA | 2856145 A1 | 10/2013 |

(Continued)

OTHER PUBLICATIONS

Granata et al., "2-Chloro-4,4,5,5-tetramethyl-1,3,2-dioxaphospholane, a Reagent for the Accurate Determination of the Uncondensed and Condensed Phenolic Moieties in Lignins", J Agric Food Chem, 43: 1538-1544 (1995).
Yanyan Chen, "Preparation of Phenol-Lignin by Phenolating Enzymolyzed Lignin and Property Study", a dissertation for master degree of South China Technical University, published on Dec. 15, 2011.
English translation of Chinese Office Action dated Jan. 25, 2017 from Application No. 201480064472.1.
M.N. Mohamad Ibrahim, et al., "Formulation of Lignin Phenol Formaldehyde Resins as a Wood Adhesive", The Malaysian Journal of Analytical Sciences, vol. 11, No. 1 (2007), 213-218.
Arunjunaj Raj Mahendran, et al., "Thermal Characterization of Kraft Lignin Phenol-Formaldehyde Resin for Paper Impregnation", VSP, Journal of Adhesion Science and Technology, 24 (2010) 1553-1565.

* cited by examiner

*Primary Examiner* — Douglas B Call
(74) *Attorney, Agent, or Firm* — Nixon Peabody LLP (57) ABSTRACT

The present invention relates to a method for treating lignin, wherein the method comprises the following steps: a) dissolving lignin into an aqueous composition, which contains a compound selected from the class of phenols and alkali, while keeping the temperature of the composition at 40-85° C., wherein the alkali comprises a hydroxide of an alkali metal; and b) heating the composition at a temperature, which is higher than the temperature of the composition in step a), with the proviso that the temperature of the composition does not exceed 100° C., while keeping the pH of the composition at a pH value of 6-14.

24 Claims, 2 Drawing Sheets

(56) References Cited

FOREIGN PATENT DOCUMENTS

| | | |
|---|---|---|
| CA | 2867744 A1 | 10/2013 |
| CA | 2867912 A1 | 10/2013 |
| CA | 2870829 A1 | 10/2013 |
| CA | 2872333 A1 | 12/2013 |
| CA | 2905599 A1 | 9/2014 |
| CA | 2940516 A1 | 10/2014 |
| CA | 2913852 A1 | 12/2014 |
| CA | 2921177 A1 | 2/2015 |
| CA | 2924977 A1 | 4/2015 |
| CA | 2925661 A1 | 4/2015 |
| CA | 2926315 A1 | 6/2015 |
| CA | 2927313 A1 | 6/2015 |
| CA | 2930604 A1 | 6/2015 |
| CA | 2930962 A1 | 8/2015 |
| CA | 2954274 A1 | 1/2016 |
| CA | 2962712 A1 | 4/2016 |
| CA | 2969109 A1 | 6/2016 |
| JP | 2003-159703 A | 6/2003 |
| JP | 2014133817 A | 7/2014 |
| WO | 2012/106808 A1 | 8/2012 |
| WO | 2013/144454 A1 | 3/2013 |

METHOD FOR TREATING LIGNIN AND FOR PRODUCING A BINDER COMPOSITION

CROSS-REFERENCE TO RELATED APPLICATIONS

This application is a 35 U.S.C. § 371 National Phase Entry Application of International Application No. PCT/FI2014/050902 filed Nov. 25, 2014, which designated the U.S., and which claims benefit of FI Application No. 20136178 filed Nov. 26, 2013, the contents of each of which are incorporated herein by reference in their entireties.

FIELD OF THE INVENTION

The invention relates to a method for treating lignin and to the use thereof for producing a binder composition as well as to different applications thereof.

BACKGROUND OF THE INVENTION

Lignin is a natural polymer, which can be extracted from e.g. wood. As lignin is a natural biopolymer its use as a component in glues instead of synthetic materials has been investigated in order to come up with a more environmentally friendly adhesive composition. Especially, the ability to replace synthetic phenol in phenolic resins, such as phenol formaldehyde resin, has been the object of prior art. Lignin can be used for the purpose of decreasing the amount of synthetic phenol in a resin composition. Lignin has previously been used for replacing phenol during the production of lignin-phenol-formaldehyde resin.

The currently known lignin based resins are not, however, suitable for all the applications where traditional phenolic resins are being used. For example, the currently known lignin based resins are not suitable for high-pressure laminates. High-pressure laminates (HPL), which are also known as plastic laminates, can be produced by fusing together under the influence of heat and pressure, multiple layers of paper, fabrics, or other core materials by using thermosetting resins as binders. The inventors have recognized a need for a method, which would result in a higher phenol replacement in the resin and thus in a more environmentally friendly binder composition having suitable properties for use in different applications such as high-pressure laminates.

PURPOSE OF THE INVENTION

The purpose of the invention is to provide a new type of method for treating lignin and to provide a method for producing a binder composition for different applications. The purpose of the invention is to provide a new binder composition and adhesive composition as well as the uses thereof.

SUMMARY

The method for treating lignin according to the present invention is characterized by what is presented in claim 1.

The method for producing a binder composition according to the present invention is characterized by what is presented in claim 10.

The binder composition obtainable by the method according to the present invention is characterized by what is presented in claim 21.

The adhesive composition according to the present invention is characterized by what is presented in claim 22.

The uses according to the present invention are characterized by what is presented in claims 20, 23, 24 and 25.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

The present invention relates to a method for treating lignin, which method comprises the following steps:

a) dissolving lignin into an aqueous composition, which contains a compound selected from the class of phenols and alkali, while keeping the temperature of the composition at 40-85° C., wherein the alkali comprises a hydroxide of an alkali metal; and b) heating the composition at a temperature, which is higher than the temperature of the composition in step a), with the proviso that the temperature of the composition does not exceed 100° C., while keeping the pH of the composition at a pH value of 6-14.

The present invention further relates to a method for producing a binder composition, wherein the method comprises the following steps:

a) dissolving lignin into an aqueous composition, which contains a compound selected from the class of phenols and alkali, while keeping the temperature of the composition at 40-85° C., wherein the alkali comprises a hydroxide of an alkali metal;

b) heating the composition at a temperature, which is higher than the temperature of the composition in step a), with the proviso that the temperature of the composition does not exceed 100° C., while keeping the pH of the composition at a pH value of 6-14; and c) mixing the composition formed in step b) with a crosslinking agent and heating the composition at a temperature of 60-100° C. while keeping the pH of the composition at a pH value of 6-14.

In one embodiment of the present invention the compound selected from the class of phenols is selected from a group consisting of phenol, cresol, resorcinol and combinations thereof. In one embodiment of the present invention the compound selected from the class of phenols is phenol.

In one embodiment of the present invention lignin is dissolved into a composition, which consists of water, at least one compound selected from the class of phenols, and alkali, in step a). In one embodiment of the present invention lignin is dissolved into an aqueous composition of a compound selected from the class of phenols and alkali.

In one embodiment of the present invention the temperature of the composition is kept, in step a), at a temperature of 65-80, and preferably at a temperature of 70-75° C.

In one embodiment of the present invention step b) comprises heating the composition at a temperature, which is at least 5° C., preferably at least 10° C., and more preferably at least 20° C. higher than the temperature of the composition in step a).

In one embodiment of the present invention the composition is heated, in step b), at a temperature of 60-100° C., preferably at a temperature of 70-95° C., and more preferably at a temperature of 75-90° C.

In one embodiment of the present invention step b) is carried out for allowing lignin to react with the compound selected from the class of phenols and the alkali.

In one embodiment of the present invention further alkali is added to the composition in step b). In one embodiment of the present invention alkali is added to the composition in step a) and in step b).

The inventors of the present invention surprisingly found out that dissolving lignin into a composition of e.g. phenol, alkali and water, at the specific temperature used, advantageously affects the time needed to dissolve lignin into the composition. The inventors of the present invention found out that treating lignin in accordance with step a) and step b) enables the production of a binder composition with a low pH value if desired. The inventors of the present invention found out that by the method of the present invention it was possible to produce a lignin based binder composition that is suitable for e.g. the production of structural wood panel products, and impregnated overlay materials. The inventors also found out that different types of lignin, such as dry or condensed lignin that are usually challenging and time-consuming to dissolve, could be more easily dissolved by the method according to the present invention. Also, the inventors noticed that the alkali used for activating lignin was not consumed during the step of dissolving lignin, whereby less chemical is needed thus lower the overall chemical costs.

In one embodiment of the present invention step b) is carried out for alkalating the lignin. The alkalation step results in the lignin being activated. Without limiting the invention to any specific theory about why alkalation of lignin results in a more activated or more reactive lignin being formed compared to non-alkalated lignin, it is to be considered that the alkalation opens the macromolecular structure of lignin whereby the steric hindrances that usually disable reactive groups in lignin structures are removed. Alkalation may also add charged groups to the lignin macromolecule. In one embodiment of the present invention treating lignin with the method according to the present invention activates the lignin. The advantage of using alkalated lignin e.g. for producing a binder composition is that the compatibility and reaction behavior is much better than in a normal case, where non-treated lignin has been used in the cooking or polymerizing stage of production process.

In this specification, unless otherwise stated, the expression "lignin" should be understood as lignin originating from any suitable lignin source.

The lignin used can be essentially pure lignin. By the expression "essentially pure lignin" should be understood as at least 90% pure lignin, preferably at least 95% pure lignin. In one embodiment of the present invention the essentially pure lignin comprises at most 10%, preferably at most 5%, of other components. Extractives and carbohydrates such as hemicelluloses can be mentioned as examples of such other components. In one embodiment of the present invention the lignin contains less than 10 weight-%, preferably less than 6 weight-%, and more preferably less than 4 weight-% of carbohydrates. The amount of carbohydrates present in lignin can be measured by high performance anion exchange chromatography with pulsed amperometric detector (HPAE-PAD) in accordance with standard SCAN-CM 71.

In one embodiment of the present invention the ash percentage of lignin is less than 7.5 weight-%, preferably less than 5 weight-%, and more preferably less than 3 weight-%. The ash content can be determined by carbonifying and quickly burning a lignin sample so that alkali salts are not melted before the organic matter has been burned (e.g. 20-200° C. for 30 minutes, after which temperature is adjusted to 200-600° C. for 1 h, and thereafter adjusting the temperature to 600-700° C. for 1 hour), and finally the lignin sample is ignited at 700° C. for 1 h. Ash content of a lignin sample refers to the mass that remains of the sample after burning and ignition, and it is presented as percent of the sample's dry content.

In one embodiment of the present invention the weight average molecular weight (Mw) of lignin is 1000-15000 g/mol, preferably 2000-10000 g/mol, and more preferably 3000-8000 g/mol. The molecular weight of the lignin can be determined by using a high-performance size-exclusion chromatography in the following manner: Two parallel measurements are carried out. 0.1 M NaOH is used as an eluent. Calibration is done using Na-polystyrene sulfonate standards having a molecular weight of 1100-73900 g/mol. For quality control, standard quality kraft lignin and PSS molecular weight standard are used. The columns used are PSS MCX precolumns, 1000 Å and 100 000 Å separation columns filled with sulfonated styrene-divinylbenzene copolymer matrix. Isocratic run program is used. The run time is 45 minutes. The injection volume is 50 µl. The flux is 0.5 ml per minute. The temperature is 25° C. As a result of the chromatography, number average molecular weight (Mn), weight average molecular weight (Mw), peak molecular weight (Mp) and polydispersity index (PDI) values can be reported.

In one embodiment of the present invention the number average molecular weight (Mn) of lignin is 700-4000, preferably 800-3000, and more preferably 1000-2500.

In one embodiment of the present invention the polydispersity of lignin is 1.0-7, preferably 1.2-6, and more preferably 1.4-4.5.

In one embodiment of the present invention the normalized radical scavenger index (NRSI) of lignin is 0.01-20, preferably 0.05-10, and more preferably 0.1-6. The antioxidant activity of extracts can be evaluated using DPPH-method in methanol extracts. The basis of the radical scavenging method is described in Malterud et al. (Pharmacol. Toxicol. 1996, 78: 111-116). The method is based on the ability of extracts and pure components to react with 1,1,-diphenylpicryl-2-hydrazylradical (DPPH.)-molecules when DPPH loses its radical characteristic. The decline of radical form can be observed with spectrophotometer as a change of solution color from violet to yellow (absorbance is measured at wavelength 515 nm). RSI (radical scavenging index) is defined as the inverse of the concentration that produced 50% inhibition in DPPH absorbance at 515 nm. The results can then be "normalized" (NRSI) by dividing the sample RSI by the RSI value for the butyl hydroxytoluene (BHT) control.

In one embodiment of the present invention the dry solids content of lignin is below 98%, preferably 40-80%, and more preferably 50-70%. The dry solids content can be measured by drying a lignin sample of 1-5 g at a temperature of 60° C. or above in a vacuum oven for four hours.

In one embodiment of the present invention the lignin has an amount of 0.1-6 mmol, preferably 0.3-3.5 mmol of aliphatic hydroxyl groups per gram of dry lignin.

In one embodiment of the present invention the lignin has an amount of 0.1-5 mmol, preferably 1.5-4.5 mmol of phenolic hydroxyl groups per gram of dry lignin. Aliphatic and phenolic hydroxyl groups can be determined by characterizing a lignin sample with 31P NMR spectroscopy after phosphitylation and after which the aliphatic hydroxyl groups can be quantitatively determined. For 31P NMR analyses 40 mg of lignin can be weighted and dissolved in 300 µl of N,N-dimethylformamide. After total dissolution 200 µl of pyridine, 400 µl (0.05M) of internal standard solution (ISTD) of Endo-N-Hydroxy-5-norbornene-2,3-dicarboximide in pyridine/$CDCl_3$ and 100 µl of $Cr(acac)_3$ solution in pyridine/$CDCl_3$ is added. Then 200 µl of phosphitylation reagent 2-chloro-4,4,5,5-tetramethyl-1,3,2-dioxaphopholane is added drop-wise. Finally 600 µl of $CDCl_3$ is added to the solution and clear brown to black solution is achieved. Freshly prepared samples can then be measured with 31P NMR at room temperature. Bruker 500 MHz NMR spectrometer can be used for the measurement. 31P NMR measurement is based on the method developed by Grannata and Argyropoulos (Grannata A. and Argyropoulos D. S., 2-Chloro-4,4,5,5-tetramethyl-1,3,2-dioxaphospholane, a reagent for the accurate determination of the uncondensed and condensed phenolic moieties in lignins. J. Agric. Food Chem, 1995, 43:1538-1544). The results are calculated as mmol/g lignin.

In one embodiment of the present invention the lignin is selected from a group consisting of kraft lignin, steam explosion lignin, biorefinery lignin, supercritical separation lignin, hydrolysis lignin, flash precipitated lignin, biomass originating lignin, lignin from alkaline pulping process, lignin from soda process, lignin from organosolv pulping and combinations thereof. In one embodiment of the present invention the lignin is wood based lignin. The lignin can originate from softwood, hardwood, annual plants or from a combination thereof.

Different lignin components may have different properties, e.g. molecular weight, molar mass, polydispersity, hemicellulose and extractive contents and compositions.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value.

The precipitated lignin can be purified from inorganic impurities, hemicellulose and wood extractives using acidic washing steps. Further purification can be achieved by filtration.

In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The method for producing flash precipitated lignin is disclosed in patent application FI 20106073. The residence time in the above method is under 300 s. The flash precipitated lignin particles, having a particle diameter of less than 2 µm, form agglomerates, which can be separated from black liquor using e.g. filtration. The advantage of the flash precipitated lignin is its higher reactivity compared to normal kraft lignin. The flash precipitated lignin can be purified and/or activated if needed for the further processing.

In one embodiment of the present invention the lignin is separated from pure biomass. The separation process can begin with liquidizing the biomass with strong alkali or strong acid followed by a neutralization process. After the alkali treatment the lignin can be precipitated in a similar manner as presented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further processing.

In one embodiment of the present invention the lignin is steam explosion lignin. Steam explosion is a pulping and extraction technique that can be applied to wood and other fibrous organic material.

By "biorefinery lignin" is to be understood in this specification, unless otherwise stated, lignin that can be recovered from a refining facility or process where biomass is converted into fuel, chemicals and other materials.

By "supercritical separation lignin" is to be understood in this specification, unless otherwise stated, lignin that can be recovered from biomass using supercritical fluid separation or extraction technique. Supercritical conditions correspond to the temperature and pressure above the critical point for a given substance. In supercritical conditions, distinct liquid and gas phases do not exist. Supercritical water or liquid extraction is a method of decomposing and converting biomass into cellulosic sugar by employing water or liquid under supercritical conditions. The water or liquid, acting as a solvent, extracts sugars from cellulose plant matter and lignin remains as a solid particle.

In one embodiment of the present invention the lignin is hydrolysis lignin. Hydrolysed lignin can be recovered from paper-pulp or wood-chemical processes.

In one embodiment of the present invention the lignin originates from an organosolv process. Organosolv is a pulping technique that uses an organic solvent to solubilize lignin and hemicellulose.

The pH value of the composition in step a) and in step b) can be selected depending on the final application of the binder composition to be produced.

In one embodiment of the present invention, the pH of the composition is kept, in step a), at the pH value of 4-10, preferably at the pH value of 4.5-9.5, more preferably at the pH value of 5-9, and even more preferably at the pH value of 5.5-8.5. In one embodiment of the present invention the pH of the composition is kept, in step b), preferably at the pH value of 6-10, more preferably at the pH value of 6.5-9.5, and even more preferably at the pH value of 7-9. These kinds of pH ranges may be used in step a) and in step b) when producing a binder composition for high-pressure laminates.

In one embodiment of the present invention, the pH of the composition is kept, in step a), at the pH value of 4-14, preferably at the pH value of 7-13.5, and more preferably at the pH value of 8.5-13. In one embodiment of the present invention the pH of the composition is kept, in step b), preferably at the pH value of 7-14, more preferably at the pH value of 9-13.5, and even more preferably at the pH value of 10-13. These kinds of pH ranges may be used in step a) and in step b) when producing a binder composition for plywood.

In one embodiment of the present invention step b) is carried out for 10 minutes-2 hours, preferably for 1 hour-1.5 hours.

In one embodiment of the present invention the alkali is sodium hydroxide, potassium hydroxide, or a combination thereof.

In one embodiment of the present invention the concentration of alkali is 0.1-11 weight-%, and preferably 0.5-9 weight-% based on the total weight of the composition in step b). In one embodiment of the present invention the concentration of alkali is 0.1-5 weight-%, and preferably 0.5-2 weight-% based on the total weight of the composition in step b). In one embodiment of the present invention the concentration of alkali is 3-15 weight-%, preferably 5-12, and more preferably 6-10 weight-% based on the total weight of the composition in step b).

In one embodiment of the present invention the concentration of lignin in step a) is 10-40 weight-%, and preferably 20-30 weight-% based on the total weight of the composition in step a).

In one embodiment of the present invention the concentration of the compound selected from the class of phenols in step a) is 10-50 weight-%, preferably 20-50 weight-%, and more preferably 20-45 weight-% based on the total weight of the composition in step a).

The step of heating the formed composition in step c) is carried out for polymerizing the reactant components, i.e. lignin, the compound selected from the class of phenols, and the crosslinking agent, such that the viscosity of the binder composition is increased. The heating can be continued until a predetermined viscosity value is formed. The predetermined viscosity value of the final binder composition may vary depending on the specific application where the binder composition is to be used.

In one embodiment of the present invention the predetermined viscosity value of the final binder composition is at least 40 cP, preferably at least 50 cP, and more preferably at least 80 cP. In one embodiment of the present invention the predetermined viscosity value of the final binder composition is at least 40 but not more than 250 cP, preferably at least 50 cP but not more than 150 cP, and more preferably at least 80 but not more than 120 cP.

In one embodiment of the present invention the predetermined viscosity value of the final binder composition is at least 250 cP, preferably at least 300 cP, and more preferably at least 500 cP. In one embodiment of the present invention the predetermined viscosity value of the final binder composition is at least 250 cP but not more than 1500 cP, preferably at least 300 cP but not more than 1200 cP, and more preferably at least 500 but not more than 1000 cP.

The viscosity is measured at 25° C. using a rotary viscometer.

In one embodiment of the present invention, step c) comprises heating the composition preferably at a temperature of 65-95° C., more preferably at a temperature of 70-90° C., and even more preferably at a temperature of 75-85° C.

In one embodiment of the present invention the crosslinking agent is selected from a group consisting of an aldehyde, a derivative of an aldehyde, an aldehyde forming compound and combinations thereof. In one embodiment of the present invention the derivative of an aldehyde is hexamethylenetetramine, paraformaldehyde or trioxane. In one embodiment of the present invention the crosslinking agent is selected from a group consisting of an aromatic aldehyde, glyoxal, furfuryl alcohol, caprolactam and glycol compounds. The aldehyde can be formaldehyde. The aromatic aldehyde can be furfuryl aldehyde. In one embodiment of the present invention the crosslinking agent is an aldehyde, and preferably formaldehyde, paraformaldehyde or a combination thereof.

In one embodiment of the present invention step c) is carried out in the presence of a catalyst. In one embodiment of the present invention the catalyst is selected from a group consisting of sodium hydroxide, potassium hydroxide and any mixture thereof.

In one embodiment of the present invention the pH of the composition is kept, in step c), preferably at a pH value of 6-10, more preferably at the pH value of 6.5-9.5, and even more preferably at the pH value of 7-9.

In one embodiment of the present invention the pH of the composition is kept, in step c), preferably at the pH value of 7-14, more preferably at the pH value of 9-13.5, and even more preferably at the pH value of 10-13.

The present invention further relates to the use of lignin treated by the method according to the present invention for the production of a binder composition.

The present invention further relates to a binder composition obtainable by the method according to the present invention.

The present invention further relates to an adhesive composition comprising the binder composition according to the present invention. The adhesive composition can further comprise one or more adhesive components selected from a group consisting of other binders, extenders, additives, catalysts and fillers.

The present invention further relates to the use of a binder composition obtainable by the method according to the present invention, wherein the pH of the composition is kept in step a) at a value of 4-10 and in step b) at a value of 6-10, for producing a laminate, and preferably a high-pressure laminate.

The present invention further relates to the use of a binder composition obtainable by the method according to the present invention, wherein the pH of the composition is kept in step c) at a value of 6-10 for producing a laminate, and preferably a high-pressure laminate.

The present invention further relates to the use of a binder composition obtainable by the method according to the present invention, wherein the pH of the composition is kept in step a) at a value of 4-10 and in step b) at a value of 6-10, for producing a foundry material, a protective coating, a friction material, an abrasive material, glass wool, rock wool, a prepreg, a shuttering film, an overlay, a molding component or a fiber reinforced composite.

The present invention further relates to the use of a binder composition obtainable by the method according to the present invention, wherein the pH of the composition is kept in step c) at a value of 6-10, for producing a foundry material, a protective coating, a friction material, an abrasive material, glass wool, rock wool, a prepreg, a shuttering film, an overlay, a molding component or a fiber reinforced composite.

The present invention further relates to the use of a binder composition obtainable by the method according to the present invention, wherein the pH of the composition is kept in step a) at a value of 4-14 and in step b) at a value of 7-14, for producing a particle board, an oriented strand board, a chip board, an intrallam, a gluelam, a hardboard, a waferboard, a fiber board, a, plywood, or a wood adhesive.

The present invention further relates to the use of a binder composition obtainable by the method according to the present invention, wherein the pH of the composition is kept, in step c), preferably at the pH value of 7-14, for producing a particle board, an oriented strand board, a chip board, an intrallam, a gluelam, a hardboard, a waferboard, a fiber board, a, plywood, or a wood adhesive.

The embodiments of the invention described hereinbefore may be used in any combination with each other. Several of the embodiments may be combined together to form a further embodiment of the invention. A method, a composition or a use, to which the invention is related, may comprise at least one of the embodiments of the invention described hereinbefore.

An advantage of the method according to the present invention is that the time needed for dissolving lignin into the aqueous composition is reduced when using the specified temperature.

An advantage of the method according to the present invention is that it is possible to treat lignin in a manner that enables the production of a low pH binder composition, i.e. a binder composition with a neutral or acidic pH range. The lignin treated with the method according to the present invention has an open structure making it more reactive whereby the production of low pH binder composition is possible with lignin.

An advantage of the present invention is that a bio-based binder composition suitable to be used for the production of high-pressure laminates can be produced by the method according to the present invention. An advantage of the present invention is that a more environmentally friendly binder composition can be produced for high-pressure laminates.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

Figure 1:
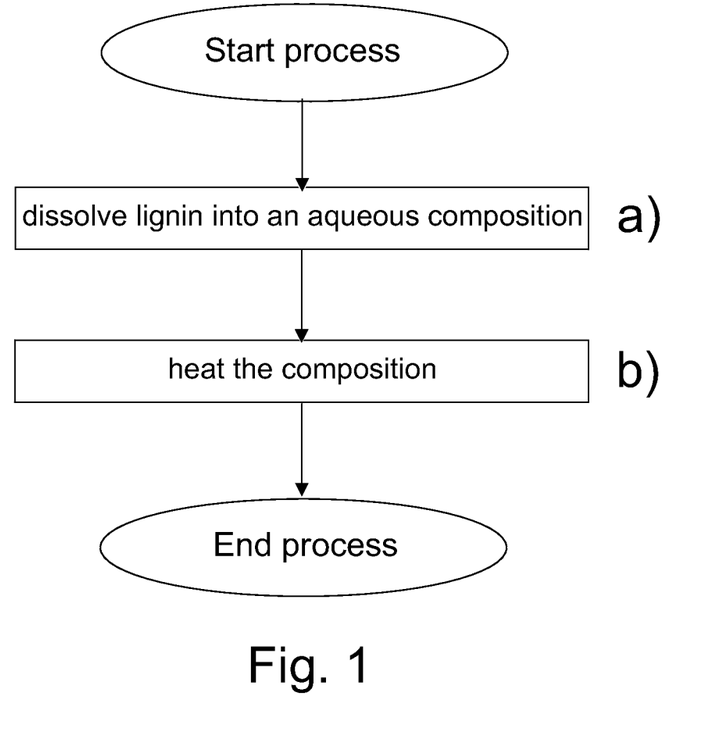
FIG. 1 is a flow chart illustration of a method for treating lignin according to one embodiment of the present invention.

FIG. 1 illustrates a method according to one embodiment of the present invention for treating lignin.

Before the treatment of lignin is started, the source of lignin is chosen. Also the other components and their amounts to be used in the method according to the present invention are selected. If needed, the components used in the method of FIG. 1 can be pre-treated to be suitable for the lignin treatment processes.

Following the various preparations and pretreatments, in one of the embodiments of the present invention shown in FIG. 1, step a) is carried out. Step a) comprises dissolving lignin into an aqueous composition containing a compound selected from the class of phenols and alkali. The alkali is a hydroxide of an alkali metal. The temperature of the composition is kept at 40-85° C.

After the step of dissolving lignin, the composition formed in step a) is heated at a temperature, which is higher than the temperature of the composition in step a), with the proviso that the temperature of the composition does not exceed 100° C., while keeping the pH of the composition at a pH value of 6-14. During step b) the lignin is allowed to react with the compounds selected from the class of phenols and the alkali.

Step a) and step b) result in the lignin being suitable for further production steps and being suitable for being covalently bonded with e.g. formaldehyde.

Figure 2:
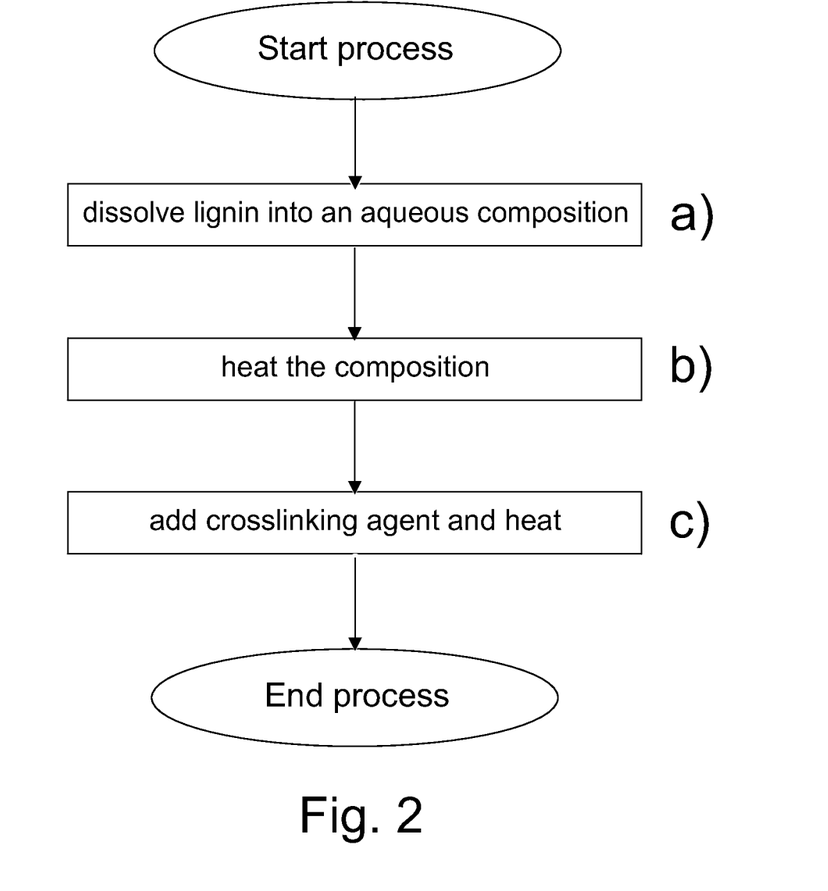
FIG. 2 is a flow chart illustration of a method for producing a binder composition according to one embodiment of the present invention.

FIG. 2 illustrates a method according to one embodiment of the present invention for producing a binder composition.

The method illustrated in FIG. 2 begins with treating lignin in step a) and step b) in accordance with the method described above for FIG. 1.

After step b) the composition formed in step b) is mixed with a crosslinking agent in step c). The formed composition is heated at a temperature of 60-100° C. for allowing the reactant components, i.e. the lignin, the compound selected from the class of phenols and the crosslinking agent, in the composition to react with each other for forming a binder composition. The pH of the composition is kept, in step c), at a pH value of 6-14. The heating of the composition is continued until a desired, predetermined, viscosity value of the binder composition is reached.

As a result of step c) a binder composition having desired properties and especially having high ratio of bio-based components is produced. This binder composition can be used as such for gluing applications or it can be further processed with other adhesive components for producing an adhesive composition.

Example 1—Activating Lignin and the Use of Activated Lignin for the Production of a Binder Composition In this example lignin was firstly treated with phenol and sodium hydroxide. The following components and their amounts were used:

| Material | MW | Concentration | Mass, g |
|---|---|---|---|
| NaOH | 40 | 50% | 266 |
| Water | 18 | 0% | 500 |
| Lignin | 180 | 68.5% | 602 |
| Phenol | 94 | 90% | 458 |

Firstly lignin was mixed with water and then sodium hydroxide was added to the formed composition. The pH was increased to a value of about 13.8. To this composition, the phenol was added. The temperature of the composition was kept at about 45° C. while dissolving lignin into the composition.

Then the temperature was increased to about 75° C. and the heating was continued for about 1 h. The pH of the composition was kept at a value of 10-11 during the heating of the composition.

Lignin treated as above described was thereafter used for producing a binder composition. 490 g of formaldehyde was added to the above formed composition in a stepwise manner. The formed composition was heated at a temperature of about 83-85° C. and until the viscosity increased to 315 cP as measured at 25° C. using a rotary viscometer.

The formed binder composition was thereafter analyzed. The results of the analysis can be seen in Table 1.

TABLE 1

| Analysis results | |
|---|---|
| Specifications | |
| MR | 1.9 |
| Solids (2 g, 2 h at 120° C.), % | 42.3 |
| Viscosity, cP | 315 |
| pH | 12.1 |
| Gel time 100° C., min | 48 |

In Table 1 MR stands for molecular ratio, i.e. the ratio of mol(formaldehyde)/mol(phenol+lignin).

The gel time was determined by adding 0.5 ml of the sample in a test tube with a rod. The sample was not to be stirred. The test tube was heated to 100° C. in a glycerin or oil bath without mixing. The time until the sample became pasty (melted solid) was measured after which the measurement was completed.

From the results indicated in Table 1 it can be seen that the solids content is on a suitable level for the binder composition to be used for wood panel products such as plywood or oriented strand boards.

Example 2—Activating Lignin and the Use of Activated Lignin for the Production of a Binder Composition In this example lignin was firstly treated with phenol and sodium hydroxide. The following components and their amounts were used:

| Material | MW | Concentration | Mass, g |
|---|---|---|---|
| NaOH | 40 | 50% | 66.0 |
| Water | 18 | 0% | 728.0 |
| Lignin | 180 | 70% | 879.0 |
| Phenol | 94 | 90% | 684.0 |

Firstly an aqueous composition was formed by mixing water, phenol and sodium hydroxide. To this aqueous composition, lignin was added. The temperature of the composition was kept at about 70-75° C. while dissolving lignin into the composition.

Then the temperature was increased to about 90° C. and the heating was continued for about 10 minutes. The pH of the composition was kept at a value of 8-8.3 during the heating of the composition.

Lignin treated as above described was thereafter used for producing a binder composition. 568 g of paraformaldehyde was added to the above formed composition in a stepwise manner. The formed composition was heated at a temperature of about 78-90° C. and until the viscosity was about 94 cP as measured at 25° C. using a rotary viscometer.

The formed binder composition was thereafter analyzed. The results of the analysis can be seen in Table 2.

TABLE 2

| Analysis results | |
|---|---|
| Specifications | |
| MR | 1.9 |
| Solids (2 g, 2 h at 120° C.), % | 52.8 |
| Viscosity, cP | 140 |

TABLE 2-continued

| Analysis results | |
|---|---|
| Specifications | |
| pH | 7.6 |
| Gel time 100° C., min | 85 |

In Table 2 MR stands for molecular ratio, i.e. the ratio of mol(paraformaldehyde)/mol(phenol+lignin).

The gel time was determined by adding 0.5 ml of the sample in a test tube with a rod. The sample was not to be stirred. The test tube was heated to 100° C. in a glycerin or oil bath without mixing. The time until the sample became pasty (melted solid) was measured after which the measurement was completed.

From the results indicated in Table 2 it can be seen that the solids content is on a suitable level for the binder composition to be used for laminates such as high-pressure laminates and for ovelays. The water tolerance is better than for traditionally used phenol-formaldehyde binder compositions used for laminates such as high-pressure laminates and for shuttering films.

Example 3—Producing Plywood

The binder composition produced in Example 1 was used for the production of an adhesive composition. The binder composition was mixed with extenders, fillers, catalysts, additives, as examples of which e.g. starch, wood flour and hardener (e.g. tannin or carbonates) can be mentioned, thus forming the adhesive composition. Thereafter, wood veneers having the thickness of below 1.5 mm were glued together with the adhesive composition produced for producing a 9-plywood. After 8 min, cold-press panels were hot-pressed at 130° C. Results showed that the gluing effect was sufficiently good for gluing wood veneers.

Example 4—Producing Shuttering Films

The binder composition produced in Example 2 was used for the production of shuttering films. Kraft papers with a weight of 42 g/m² were impregnated with the binder composition and dried at 130° C. The impregnated paper was pressed on one side of plywood at 145° C. for 6 min. Results showed that the shuttering film was performing sufficiently good; no blisters on the surface or delamination were observed.

Example 5—Activating Lignin and the Use of Activated Lignin for the Production of a Binder Composition In this example lignin was firstly treated with phenol and sodium hydroxide. The following components and their amounts were used:

| Material | MW | Concentration | Mass, g |
|---|---|---|---|
| NaOH | 40 | 50% | 66.0 |
| Water | 18 | 0% | 250.0 |
| Lignin | 180 | 70% | 879.0 |
| Phenol | 94 | 90% | 684.0 |

Firstly an aqueous composition was formed by mixing water, phenol and sodium hydroxide. To this aqueous composition, lignin was added. The temperature of the composition was kept at about 70-75° C. while dissolving lignin into the composition.

Then the temperature was increased to about 90° C. and the heating was continued for about 10 minutes. The pH of the composition was kept at a value of 8-8.3 during the heating of the composition.

Lignin treated as above described was thereafter used for producing a binder composition. 568 g of paraformaldehyde was added to the above formed composition in a stepwise manner. The formed composition was heated at a temperature of about 76° C. until the viscosity was about 930 cP as measured at 25° C. using a rotary viscometer.

The formed binder composition was thereafter analyzed. The results of the analysis can be seen in Table 3.

TABLE 3

Analysis results

| Specifications | |
|---|---|
| MR | 1.9 |
| Solids (2 g, 2 h at 120° C.), % | 65.1 |
| Viscosity, cP | 780 |
| pH | 7.62 |
| Gel time 130° C., min | 8 |

In Table 3 MR stands for molecular ratio, i.e. the ratio of mol(paraformaldehyde)/mol(phenol+lignin).

The gel time was determined by adding 0.5 ml of the sample in a test tube with a rod. The sample was not to be stirred. The test tube was heated to 130° C. in a glycerin or oil bath without mixing. The time until the sample became pasty (melted solid) was measured after which the measurement was completed.

The formed binder composition was used to produce a pre-preg by adding to the cooled binder composition firstly about 2 weight-%, based on the weight of the binder composition, of diethylene glycol (DEG) and then below 1 weight-%, based on the weight of the binder composition, of glycolic acid.

Example 6—Formation of Rock Wool

In this example rock wool was formed. Firstly lignin was treated with phenol and sodium hydroxide. The following components and their amounts were used:

| Material | MW | Concentration | Mass, g |
|---|---|---|---|
| NaOH | 40 | 50% | 111.7 |
| Water | 18 | 0% | 227.2 |
| Lignin | 180 | 70% | 171.9 |
| Phenol | 94 | 90% | 534.5 |

Firstly lignin was added to a composition of water, phenol and sodium hydroxide. To this composition 45.4 g of borax was added in a stepwise manner. Borax is a commonly used product in rock wool to enhance fire resistance and to act as an anti-moulding agent. Borax does not take part in the reactions where lignin is dissolved and allowed to react with phenol and NaOH. Borax can be added to the composition in the beginning of the process to ensure even distribution in the polymer matrix but it could also be added only after the binder composition formation.

The temperature of the composition was kept at about 42° C. and the pH of the composition was about 9-10 while allowing lignin to dissolve.

Thereafter the temperature of the composition was increased up to 50° C. and the lignin was allowed to react with phenol and sodium hydroxide in the composition for about an hour. The pH of the composition was about 9.3.

After the lignin had been activated by the above procedure, 1093.5 g of formaldehyde was added to the composition and the composition was heated at 65° C. for about 2.5 hours. The pH was kept at about 8.8. Then the composition was cooled to a temperature of 40° C., about 1 weight-%, based on the weight of the composition, of boric acid was added followed by about 4-5 weight-%, based on the weight of the composition, of urea.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for treating lignin, the method comprising:
   a) dissolving at least 90% pure lignin into an aqueous composition, which includes alkali and a compound selected from the class of phenols, while keeping the temperature of the composition at 40-85° C. and the pH of the composition at a pH value of 4-10, wherein the alkali comprises a hydroxide of an alkali metal; and
   b) alkalating the lignin by heating the composition at a temperature higher than the temperature of the composition in step a), with the proviso that the temperature of the composition does not exceed 100° C., while keeping the pH of the composition at a pH value of 6-10,
   wherein the heating of step b) is carried out for between 10 minutes and 2 hours, the heating allowing the dissolved lignin to react with the alkali and the compound selected from the class of phenols, and wherein the lignin is selected from a group consisting of kraft lignin, steam explosion lignin, biorefinery lignin, supercritical separation lignin, hydrolysis lignin, flash precipitated lignin, biomass originating lignin, lignin from alkaline pulping process, lignin from soda process, lignin from organosolv pulping and combinations thereof.

2. The method of claim 1, wherein the compound selected from the class of phenols is selected from a group consisting of phenol, cresol, resorcinol and combinations thereof.

3. The method of claim 1, wherein the temperature of the composition is kept, in step a), at a temperature of 65-80° C.

4. The method of claim 1, wherein step b) comprises heating the composition at a temperature, which is at least 5° C. higher than the temperature of the composition in step a).

5. The method of claim 1, wherein the pH of the composition is kept, in step a), at the pH value of 4.5-9.5.

6. The method of claim 5, wherein the pH of the composition is kept, in step b), at the pH value of 6.5-9.5.

7. The method of claim 1, wherein the pH of the composition is kept, in step a), at the pH value of 5-9.

8. The method of claim 7, wherein the pH of the composition is kept, in step b), at the pH value of 7-9.

9. The method of claim 1, wherein the composition is heated, in step b), at a temperature of 60-100° C.

10. The method of claim 1, wherein the act of alkalating the lignin by heating the composition in step b) results in the formation of a binder composition.

11. The method of claim 1, wherein the pH of the composition in step a) is kept at a pH value of 5.5 to 8.5.

12. The method of claim 1, wherein the pH of the composition in step b) is kept at a pH value of 7 to 9.

13. A method for producing a binder composition, the method comprising:

a) dissolving at least 90% pure lignin into an aqueous composition, which includes alkali and a compound selected from the class of phenols, while keeping the temperature of the composition at 40-85° C. and the pH of the composition at a pH value of 4-10, wherein the alkali comprises a hydroxide of an alkali metal;

b) alkalating the lignin by heating the composition at a temperature, which is higher than the temperature of the composition in step a), with the proviso that the temperature of the composition does not exceed 100° C., while keeping the pH of the composition at a pH value of 6-10; and mixing the composition formed in step b) with a crosslinking agent and heating the composition at a temperature of 60-100° C. while keeping the pH of the composition at a pH value of 6-10, wherein the heating of step b) is carried out for between 10 minutes and 2 hours, the heating allowing the dissolved lignin to react with the alkali and the compound selected from the class of phenols, and wherein the lignin is selected from a group consisting of kraft lignin, steam explosion lignin, biorefinery lignin, supercritical separation lignin, hydrolysis lignin, flash precipitated lignin, biomass originating lignin, lignin from alkaline pulping process, lignin from soda process, lignin from organosolv pulping and combinations thereof, wherein the viscosity of the binder composition is about 40-250 cP.

14. The method of claim 13, wherein step b) comprises heating the composition at a temperature, which is at least 5° C. higher than the temperature of the composition in step a).

15. The method of claim 13, wherein step c) comprises heating the composition at a temperature of 65-95° C.

16. The method of claim 13, wherein the pH of the composition is kept, in step a), at the pH value of 4.5-9.5.

17. The method of claim 16, wherein the pH of the composition is kept, in step b), at the pH value of 6.5-9.5.

18. The method of claim 13, wherein the pH of the composition is kept, in step a), at the pH value of 5-9.

19. The method of claim 18, wherein the pH of the composition is kept, in step b), at the pH value of 7-9.

20. The method of claim 13, wherein the pH of the composition is kept, in step c), at a pH value of 6.5-9.5.

21. The method of claim 20, wherein the pH of the composition is kept, in step c), at a pH value of 7-9.

22. The method of claim 13, wherein the crosslinking agent is an aldehyde.

23. A binder composition obtainable by the method of claim 13.

24. An adhesive composition comprising the binder composition of claim 23.

* * * * *